UNITED STATES PATENT OFFICE.

SAMUEL L. MOSER, OF UPPER SANDUSKY, OHIO.

ALIMENTARY PRODUCT AND METHOD OF MAKING THE SAME.

985,621.     Specification of Letters Patent.     Patented Feb. 28, 1911.

No Drawing.     Application filed November 29, 1909. Serial No. 530,471.

*To all whom it may concern:*

Be it known that I, SAMUEL L. MOSER, a citizen of the United States, residing at Upper Sandusky, in the county of Wyandot and State of Ohio, have invented a new and useful Alimentary Product and Method of Making the Same, of which the following is a specification.

This invention relates to an alimentary product in the form of flaked grain and the process of manufacturing the same, the invention having for its primary object the making of a food product which retains all the natural properties of the grain, and is so treated as to have highly nutritive and laxative properties by the retention of all the bran and at the same time is pleasing to the taste.

The process consists, in general terms, in boiling the whole wheat and other grains a sufficient length of time to soften the particles thereof without, however, breaking the shells so that none of the nutriment will be lost, and after the grain is drained and while still partially warm, butter or other equivalent edible oil is applied thereto, the heat causing the butter or oil to evenly spread over the wheat grains and to come directly in contact with the bran. Salt, sugar or the like may be added at this stage to improve the taste and thereafter the grains, while either warm or cold, are passed between cold rolls for crushing and forming the berries into flakes. During this crushing operation, the rolls are supplied with Graham, wheat or other flour for the double purpose of insuring an efficient crushing operation, maintaining the grains in individual flake form, and coating the flakes with flour so that the resultant product will be more nutritious by the addition of the Graham or other flour and the flakes will not adhere during the roasting operation. Graham flour is preferred because it adds to the laxative property of the product. The flour-coated and flaked product is placed in trays in a comparatively thick layer to be placed in the oven for roasting, the trays receiving a gentle motion to agitate the flakes, or an occasional gentle stirring.

The machine for carrying out the process will be here briefly described, although reference is to be had to my copending application Serial Number 530,472 on the machine for a more complete understanding thereof. The machine consists of a pair of coacting rolls adjustable toward each other and rotating at different speeds to receive the previously boiled, oiled and seasoned grain berries which are fed to the rolls by gravity from a superimposed hopper, and simultaneously the approaching portions of the rolls are coated with Graham or other flour so as to be taken up by the grains and thus give the rolls an opportunity to draw the grains between them. The opposite sides of the resulting flakes become coated with the flour which adheres thereto and becomes an essential part of the food product.

In carrying out the process, six pounds of wheat or other grain will be boiled for a period of about forty-five minutes which is sufficient to cause the grains to swell without bursting and after draining the grains to remove any excess water and while the grains are still warm, a half pound of butter or a suitable quantity of other edible oil product is added, together with salt, sugar or the like for seasoning. This mass is then thoroughly stirred so that the butter and salt will be evenly distributed over the individual grains and come directly in contact with the bran, the heat assisting in the even distribution of the butter or oil. This thoroughly stirred mixture is then supplied to the hopper of the machine to feed to the crushing rolls, which latter are constantly supplied with Graham, wheat or other flour during the crushing of the grains. This flour serves several purposes, in that it forms a dry covering over the oiled, slippery, or waxy grains, and gives the smooth rolls an opportunity to frictionally grip the grains and draw them between the crushing portions of the rolls, and also the flour forms a covering over the grains to preserve the individual flake form thereof and prevent adhesion to such a degree that a relatively thick layer of the flakes may be roasted until crisp, in an oven, with but little agitation. Furthermore, the coating of the grains with flour furnishes a ready means for regulating the quality of the food product as to its nutritive and laxative values. After passing through the rolls, the flakes are placed in close meshed gauze trays and submitted to the drying effect of heated air in a roasting oven, whereby the flakes are dried and rendered crisp, and the flour adhering to the flakes becomes baked thereon. The butter or oil forms a moisture-excluding protection for the flakes so that they will remain crisp for a considerable length of time.

It has been found, by actual test, that the crispness of the flakes treated in the foregoing manner is of considerably longer duration than any other commonly known breakfast food of the flake type on the market. Furthermore, it will be seen that the grains do not lose any of their natural qualities as the boiling does not continue long enough to be detrimental and the bran is entirely retained, so that the food product is valuable in its decided laxative qualities. Although it may be preferable to add salt to the butter, as heretofore described, it is to be understood that the salt can be added after the crushing operation or it can be added to season the food when it is eaten, at the same time the sugar and cream or milk are applied.

By the herein described process, all the constituent elements of the grains are retained and no special skill is required to carry out the process, so that it can be readily practiced in homes by the use of any suitable means for crushing or rolling the grains and applying the flour coating in the manner described, and finally roasting the flakes in the stove.

While the preferred process contemplates the use of edible oil, still a more or less satisfactory product can be produced by omitting this step and applying the flour to the grains after they have been boiled and at the time of crushing the same. Also, in some instances as where whole wheat is made use of, the process could omit the step of adding the flour, dependence being placed upon the use of whole wheat for the laxative property of the product. In every instance, however, the flake must be roasted.

Having thus described the invention, what I claim as new, and desire to secure by Letters Patent, is:—

1. That process of preparing food products which consists in boiling the grains sufficiently to soften the particles thereof without cracking the shells of the grains, thoroughly mixing edible oil with the grains while warm to evenly coat the same, crushing the oil-coated grains with the bran thereon and without separating the bran from the grains, and finally roasting the flakes resulting from the crushing operation.

2. That process of producing food products which consists of boiling wheat grains sufficiently for softening the same, applying butter to the grains while still warm and stirring the grains and butter to cause the grains to be evenly coated with butter, passing the butter-coated grains with the bran thereon between rollers, and rendering the flakes resulting from the rolling operation crisp by roasting.

3. That process of producing food products which consists in boiling the grains until soft, applying butter and salt to the grains while partially warm, thoroughly mixing the same by mechanical agitation, passing the grains with the bran thereon between crushing rolls, and drying the flakes by roasting.

4. The herein described process of producing a food product which consists in boiling the grains whole until soft, applying an edible oil to the boiled grains, applying flour to the oil-coated grains, passing the coated grains with the bran thereon between crushing rolls, and finally drying the resulting flakes by roasting.

5. The herein described process of producing an alimentary product which consists in boiling the grains, applying an edible oil to the grains, simultaneously crushing and applying Graham flour to the grains, and roasting the resulting flakes to dry the same and bake the flour thereon.

6. The herein described process of producing an alimentary product which consists in softening the whole grains, applying an edible oil as a coating to the individual grains, crushing the grains with the bran thereon between rolls while simultaneously compressing flour into the flakes from opposite sides, and finally drying and baking the flour on the flakes by roasting.

7. An alimentary product in the form of a baked or roasted whole wheat flake having an adhering added coating of baked Graham flour particles.

8. An alimentary product in the form of a baked or roasted cereal flake with the bran thereon, treated with edible oil and having an adhering coating of baked flour particles.

9. An alimentary product in the form of a baked or roasted cereal flake impregnated with edible oil and having an adhering coating of baked Graham flour particles.

10. An alimentary product in the form of a baked or roasted cereal flake with the bran thereon impregnated with edible oil.

In testimony that I claim the foregoing as my own, I have hereto affixed my signature in the presence of two witnesses.

SAMUEL L. MOSER.

Witnesses:
 FRED F. WALTON,
 A. K. HALL.